United States Patent
Camosso

[11] 3,729,239
[45] Apr. 24, 1973

[54] ROLLER BEARING AND CAGES THEREFOR

[75] Inventor: Domenico Camosso, Turin, Italy

[73] Assignee: RIV-SKF Officine di Villar Perosa S.p.A., Turin, Italy

[22] Filed: May 7, 1971

[21] Appl. No.: 141,315

[30] Foreign Application Priority Data

May 22, 1970 Italy..............................68762 A/70

[52] U.S. Cl....................................................308/217
[51] Int. Cl................................................F16c 33/46
[58] Field of Search....................308/201, 217, 218

[56] References Cited

UNITED STATES PATENTS

| | | | |
|---|---|---|---|
| 3,075,278 | 1/1963 | Bratt | 308/217 |
| 3,110,529 | 11/1963 | Schaeffler | 308/217 |

FOREIGN PATENTS OR APPLICATIONS

| | | | |
|---|---|---|---|
| 456,366 | 11/1936 | Great Britain | 308/217 |
| 515,959 | 4/1953 | Italy | 308/217 |
| 931,020 | 7/1955 | Germany | 308/217 |

Primary Examiner—Charles J. Myhre
Assistant Examiner—Frank Susko
Attorney—Sughrue, Rothwell, Mion, Zinn & Macpeak

[57] ABSTRACT

A roller bearing cage in which the rollers are held in pockets formed between adjacent radially projecting longitudinally extending teeth is disclosed. The teeth may be either inwardly or outwardly radially directed or alternately inwardly and outwardly radially directed. In the latter case the pocket formed between adjacent similarly directed teeth is provided in a cavity in the corresponding oppositely directed tooth. The teeth are undercut so that the rollers can be snapped into place in the pockets and located in position by the teeth. Each pocket has an aperture in its base through which the curved surface of the roller projects so as to be able to make contact with both of the bodies which are to have relative rotational movement with the aid of the roller bearing.

14 Claims, 11 Drawing Figures

Patented April 24, 1973 3,729,239

INVENTOR
DOMENICO CAMOSSO

BY Sughrue, Rothwell, Mion,
Zinn & Macpeak
ATTORNEYS

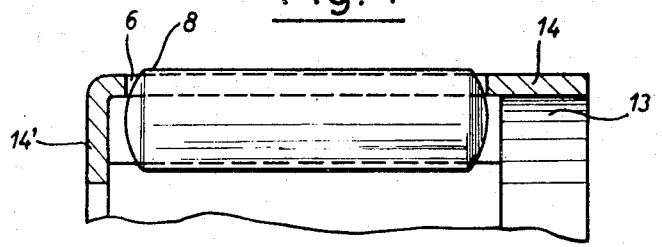
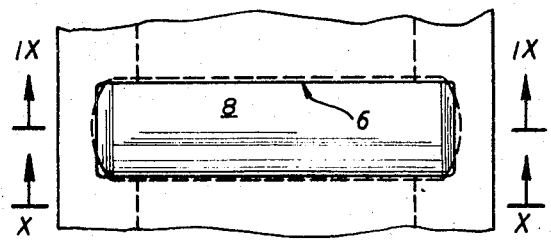
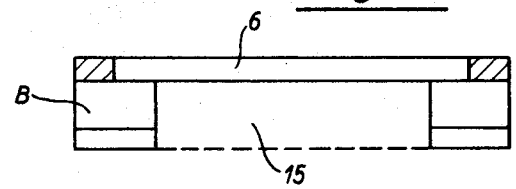
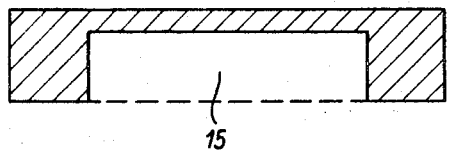
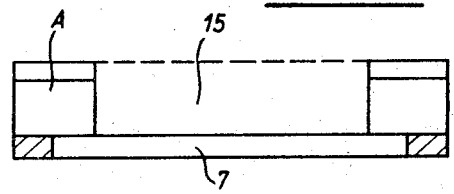

ROLLER BEARING AND CAGES THEREFOR

BACKGROUND OF THE INVENTION

The present invention relates to roller bearings, and particularly to roller bearings of the type having a cage for supporting a number of rollers against inwardly directed and outwardly directed radial movement. In use of such a roller bearing the rollers come into direct contact with the two coaxial bodies which are to have relative rotational movement.

In particular, the present invention relates to cages for roller bearings, which cages are formed by a substantially tubular member having a plurality of radially directed axial extending teeth. The teeth normally extend in the direction of the axis of the tubular body, and the spaces between adjacent teeth form the locations for the rollers. Such cages are made from pressed and cut metal thin walled tubing, or from thicker walled tubular elements which are drawn or are machined to create the desired cross-sectional profile of the cage, pockets being formed to receive the rollers. The cage can also be made by sintering.

SUMMARY OF THE INVENTION

According to the present invention there is provided a cage for a roller bearing comprising a generally tubular member having a plurality of radially projecting teeth extending longitudinally in the direction of the axis of the tubular member, the spaces between adjacent teeth forming the locations for the rollers, in which the sides of the teeth are undercut for radially retaining the rollers in the spaces between the teeth, and the base of the space between adjacent teeth is formed with an aperture longer than the rollers which are to be mounted in the said spaces and narrower than the diameter of the said rollers such that part of the surface of a roller in said space can project through the said aperture.

In one embodiment of the invention the teeth of the tubular member are alternately inwardly and outwardly radially directed, and each space for locating a roller is formed in a cavity in a tooth, which cavity is defined by two adjacent teeth directed in the same radial direction.

It is an object of the present invention to provide cages for roller bearings which are capable of locating and retaining rollers against both inwardly and outwardly directed radial movement.

It is another object of the present invention to provide a cage which can be manufactured relatively simply and which will have a high mechanical strength.

Conveniently the said tubular member is formed from sheet material and the said teeth are provided by longitudinal ridges formed in the sheet material, the sides of the teeth being undercut so that the parts of adjacent teeth which are closest together are those parts adjacent the crown of each tooth, this distance being less than the diameter of the roller which is to be retained in the space between the said adjacent teeth. Alternatively a cage for a roller bearing may be constructed as an embodiment of the present invention by drawing from a tubular workpiece, by sintering to form the shape of the tubular member of the cage, or by machining splines from a relatively thick tubular workpiece to form the shape of the said tubular member.

In order to increase the structural strength of the tubular member at least part of the tubular member may be folded at the end thereof. This may conveniently be achieved by removing those parts of the end of the tubular member which would resist such folding to leave the parts which can be so folded either radially inwardly or radially outwardly.

In one embodiment of the present invention the crown of each tooth is relieved for at least part of the length of the tooth intermediate the ends so that only the end portions of a roller will engage with the said teeth to be retained in position thereby. This provides a considerable reduction in weight of the cage without affecting the structural strength or the accuracy of location of the rollers.

The present invention also embraces a roller bearing having a cage as described and claimed herein.

Various other advantages and objects of the present invention will become more apparent from the following description with reference to the accompanying drawings, which is presented merely by way of example.

BRIEF DESCRIPTION OF THE DRAWINGS

FIG. 7 is a partial longitudinal section of an embodiment having reinforced flanges 14';

FIG. 8 is a developed view of a portion of the interior surface of a further embodiment;

FIG. 9 and FIG. 10 are two longitudinal schematic sections taken respectively on the lines IX–IX and X—X of FIG. 8; and FIG. 11 is a longitudinal section of an embodiment of the invention constructed as a variation of the embodiments illustrated in FIGS. 8, 9, and 10.

DESCRIPTION OF THE PREFERRED EMBODIMENTS

Figure 1:
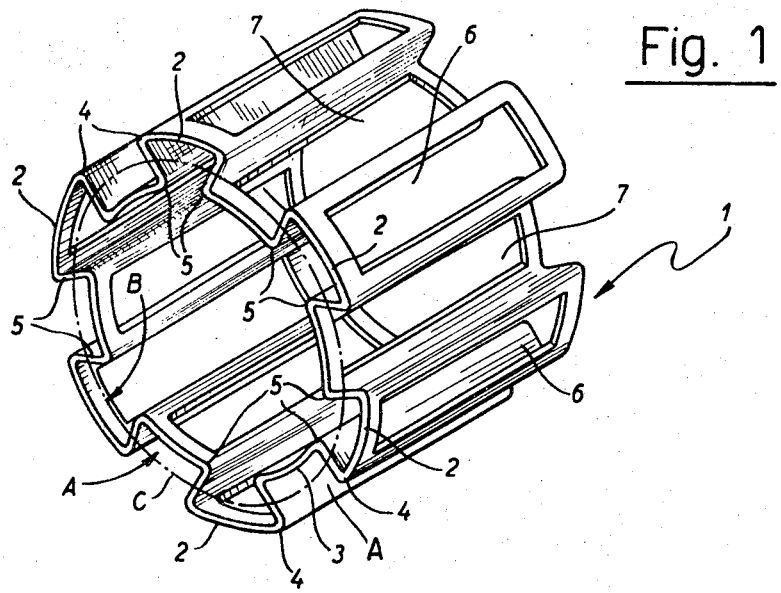
FIG. 1 is a perspective view of one embodiment of a cage for a roller bearing constructed in accordance with the present invention, formed from a pressed metal tube.

Referring now to FIG. 1 there is shown a cage generally indicated 1 comprising a generally cylindrical member formed by pressing a relatively thin walled tube. The tubular member 1 is shaped to provide a plurality of outwardly radially directed ridges 2 having, between each adjacent pair of ridges 2, a groove or recess A that extends along the full length of the cage. Because the tubular member 1 is formed from a thin tube each recess A provides an inwardly radially directed ridge 3 and the outwardly radially directed ridges 2 provide a groove or recess B between each adjacent pair of inwardly radially directed ridges 3.

Figure 6:
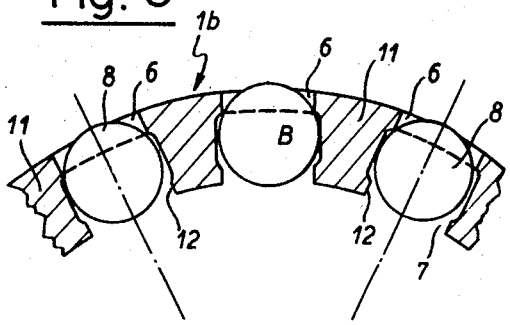
FIG. 6 is a partial transversal section taken on the line VI—VI of FIG. 3.
Figure 5:
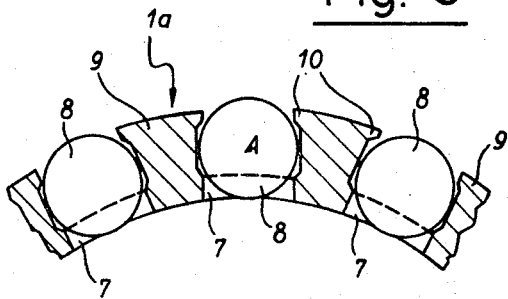
FIG. 5 is a partial transversal section taken on the line V—V of FIG. 2.

The relative dimensions of the outwardly directed ridges 2 and the inwardly directed ridges 3 are such that each recess between adjacent ridges is undercut so that the floor or base of the recess is wider than the mouth of the recess. The material from which the tubular member 1 is formed is resilient so that rollers can be introduced into the undercut recesses A by resilient deformation of adjacent ridges 2. Similarly rollers can be introduced into the recesses B by resilient deformation of adjacent ridges 3. As will be seen from FIG. 1 the crowns of the teeth formed by the ridges 2 are formed with rectangular apertures 6, and the crowns of the teeth formed by the ridges 3 are formed with rectangular apertures 7. The apertures 6 and 7 are longer than the rollers 8 (see FIGS. 5 and 6) which are to be retained in appropriate spaces between teeth, and are narrower than the diameter of these rollers.

It will be seen that the mean line C of the tubular member 1 corresponds with the pitch circle of the rollers.

Figure 2:
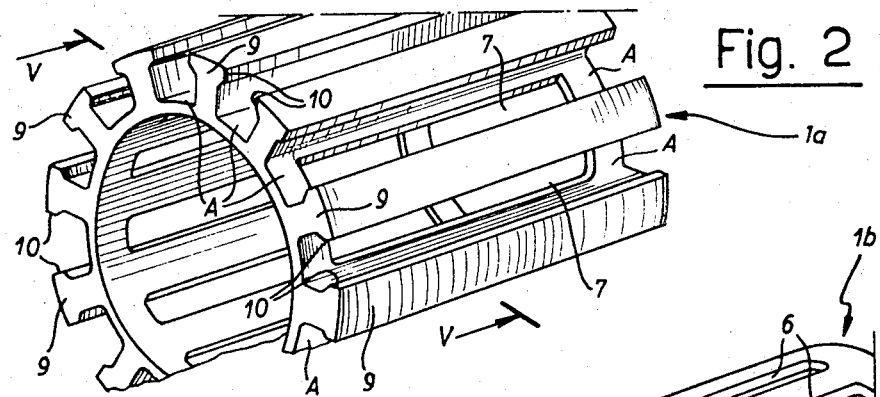
FIG. 2 is a schematic perspective view of a second embodiment of a cage constructed in accordance with the present invention, formed from a tubular body.

Referring now to FIG. 2 there is shown an alternative embodiment of the present invention comprising a cage for roller bearings generally indicated 1a. The cage 1a is formed from a thick tubular member to have a plurality of outwardly radially projecting longitudinally extending teeth 9. Between each tooth 9 there is a longitudinally extending recess or groove A, and the sides of the teeth 9 are undercut to provide a lateral projection 10 on the upper part of each side wall so that the recess A can retain a roller 8 (see FIGS. 4 and 5) introduced into the groove A by resilient deformation of the resilient teeth 9. The base of each recess A is provided with an aperture 7 corresponding in function and dimension to the apertures 7 of the tubular member 1 illustrated in FIG. 1. The dimensions of the recesses A and the apertures 7 are such that when the appropriate rollers are introduced into each recess A a portion of the curved surface of each roller projects inwardly through the aperture 7 and a portion of the curved surface of the roller projects outwardly between the adjacent teeth 9.

Figure 3:
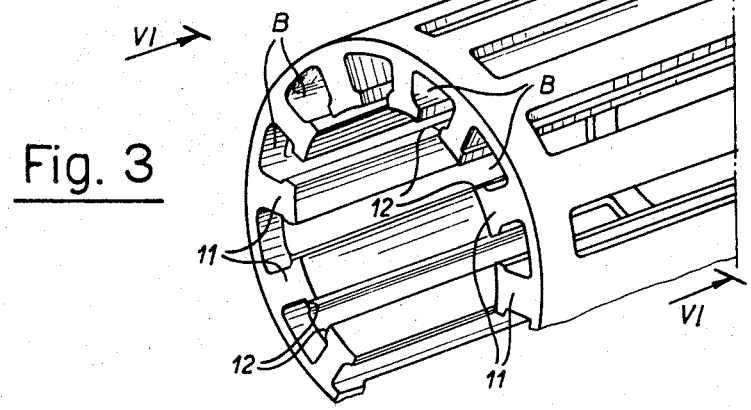
FIG. 3 is a schematic perspective view of a third embodiment of a cage constructed in accordance with the present invention, also formed from a tubular body.

In FIG. 3 there is shown an alternative embodiment constructed in a manner similar to the construction of the embodiment illustrated in FIG. 2. However, in this embodiment a relatively thick tubular member 1 is formed with a plurality of inwardly radially directed teeth 11, the side walls of which are undercut to form projections 12 which determine the cross-sectional shape of the spaces B between each pair of adjacent teeth. The grooves or recesses B are also inwardly radially facing and the bases of the recesses B are each provided with an aperture 6, the dimensions and function of which corresponds with the dimensions and function of the apertures 6 of the embodiment illustrated in FIG. 1. Again, it will be seen from FIG. 3 that the projections 12 define the cross sectional shape of the recesses B such that these recesses can retain a roller introduced either from one end or by resilient deformation of the adjacent pair of teeth 11.

Figure 4:
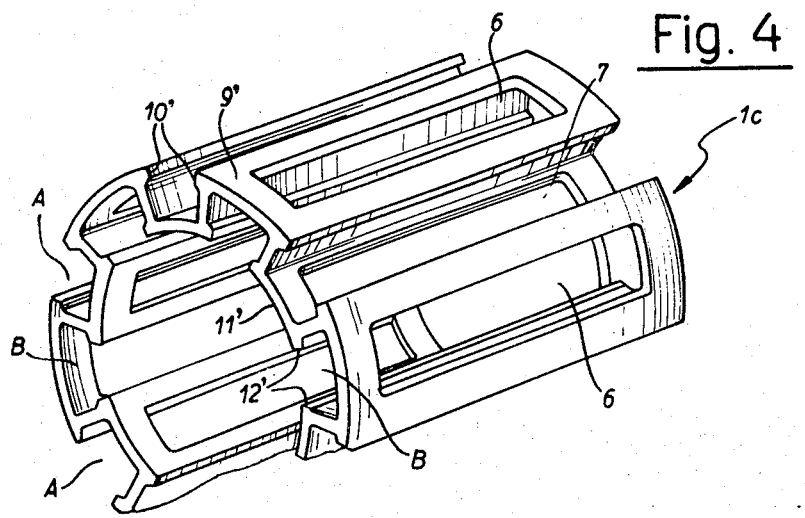
FIG. 4 is a schematic perspective view of a fourth embodiment of a cage constructed in accordance with the present invention as a variation of the embodiments of FIG. 2 and FIG. 3.

FIG. 4 illustrates an embodiment of the invention which may be considered as a combination of the embodiments of FIG. 2 and FIG. 3. A roller bearing cage generally indicated 1c is formed from a relatively thick tubular member to have a plurality of outwardly radially directed teeth 9' and a plurality of inwardly radially directed teeth 11'. The outwardly radially directed teeth 9' are formed with cavities B which are in the form of recesses between pairs of adjacent inwardly radially directed teeth 11'. Similarly, each inwardly radially directed tooth 11' is formed with a cavity which provides a recess A between each pair of adjacent outwardly radially directed teeth 9'. Thus an embodiment which is similar to the embodiment of FIG. 1 is formed from a solid tubular member 1c. The crowns of the teeth 9' which represent the bases of the recesses B are each provided with a rectangular aperture 6, and the crowns of the teeth 11' which represent the bases of the recesses A are each provided with a rectangular aperture 7. The crowns of the teeth 9' are provided with laterally projecting ridges 10' which effectively provide an undercut in the side walls of the teeth 9', and thus the shape of the recesses A is such that they can retain a roller which is inserted by resilient deformation of the adjacent teeth. Similarly the crowns of the teeth 11' are provided with laterally projecting ridges 12' which effectively provide an undercut in each side wall of the teeth 11' to modify the cross sectional shape of the recesses B for the same purpose.

Thus it will be seen that there are a number of different ways of constructing embodiments of the present invention. The embodiment of FIG. 1 can be formed from a thin-walled tube which is pressed to the shape illustrated in FIG. 1, the apertures 6 and 7 being subsequently punched in the crowns of the appropriate teeth. Starting from a thin walled tube the flutings or ridges which provide the inwardly and outwardly radially directed teeth can be formed by drawing. Similarly, starting from a thin walled tube the inwardly and outwardly radially directed teeth may be formed by sintering, that is, building a segment of the tube which represents on either the outside or the inside surface, or alternatively on both surfaces, the moulded flutings or ridges and the apertures. Alternatively, starting with a relatively thick walled tube, the teeth may be formed by machining out the intervening recesses in a manner similar to the forming of splines.

The cage 1, in the case of the embodiment of FIG. 1 or the cage 1a, 1b or 1c in the case of the embodiments of FIGS. 2, 3 or 4 may be strengthened by removing a portion of the cage to leave a circumferentially aligned portion 14 or 14' as shown in FIG. 7. The portion 14 can then be folded so as to be either inwardly or outwardly radially directed to strengthen the end of the cage. In FIG. 7 the portion 14' is shown folded so as to be inwardly radially directed.

As illustrated in FIGS. 8 to 11, the cage can be made lighter by removing a part 15 of the crown of each tooth, as shown particularly in FIG. 11. The rollers are thus engaged by the appropriate recesses in which they are retained only at their ends. This represents a considerable saving in weight.

What is claimed is:

1. A method of making a cage for a roller bearing, comprising forming a tubular metal body having radially innermost and radially outermost surfaces of substantially the same length and having a series of longitudinal grooves extending along the full length thereof, each groove having a floor and undercut side walls, the floor of each groove being defined by one side of a sector of the tubular body whose other side lies in one of said surfaces of the tubular body, and forming in the floor of each groove a longitudinally elongated hole; the groove being adapted to receive a roller which is adapted to be retained in the cage against movement in the radially inward and radially outward directions by, in one such direction, the undercut side walls of the groove, and, in the other such direction, the longitudinal edges of the elongated hole.

2. The method of claim 1 comprising forming the grooves in the outer surface of the tubular body.

3. The method of claim 1 comprising forming the grooves in the inner surface of the tubular body.

4. The method of claim 1 comprising forming the grooves alternately in the outer and inner surfaces of the tubular body.

5. The method of claim 4 wherein the forming of the tubular body is accomplished by pressing the body from a thin-walled tube of circular cross-section and the forming of the elongated holes is accomplished by punching.

6. The method of claim 5 further comprising the forming of the side walls of each groove so that they are planar and extend radially with respect to the axis of the cage to give the grooves a dovetail-type undercut.

7. The method of claim 1 further comprising forming the grooves so that they are separated from each other by longitudinally extending splines.

8. The method of claim 1 in which the tubular body is formed by drawing a tube of circular cross-section, and thereafter cutting the elongated holes in the floors of the grooves.

9. The method of claim 1 in which the tubular body is made by machining the grooves into a tube of substantial wall thickness and thereafter cutting the elongated holes into the floors of the grooves.

10. The method of claim 1 in which the tubular body is made by sintering.

11. The method of claim 7 including the step of removing a portion of the splines between their ends.

12. The method of claim 1 in which the sides walls of the grooves are formed with lateral projections at the mouth of the grooves.

13. A cage for a roller bearing, comprising a tubular body having radially innermost and radially outermost surfaces of substantially the same length and having a series of longitudinal grooves extending along the full length thereof, each groove having a floor and undercut side walls, the floor of each groove being defined by one side of a sector of the tubular body whose other side lies in one of said surfaces of the tubular body, the floor of each groove having a longitudinally extending hole whereby each groove can receive a roller which is adapted to be retained in the cage against movement in the radially inward and radially outward directions by, in one such direction, the undercut side walls of the groove, and in the other such direction, the longitudinal edges of the elongated hole.

14. The cage of claim 13 in which the grooves are located alternately in the inner and outer surfaces of the tubular body.

* * * * *